United States Patent
Chen et al.

(10) Patent No.: US 11,799,525 B2
(45) Date of Patent: Oct. 24, 2023

(54) SUBBAND-GRANULARITY LINEAR COMBINATION FOR A CSI CODEBOOK

(71) Applicant: QUALCOMM Incorporated, San Diego, CA (US)

(72) Inventors: Bo Chen, Beijing (CN); Pavan Kumar Vitthaladevuni, San Diego, CA (US); Yu Zhang, Beijing (CN); Ruifeng Ma, Beijing (CN); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/250,896

(22) PCT Filed: Sep. 26, 2019

(86) PCT No.: PCT/CN2019/108051
§ 371 (c)(1),
(2) Date: Mar. 22, 2021

(87) PCT Pub. No.: WO2020/063719
PCT Pub. Date: Apr. 2, 2020

(65) Prior Publication Data
US 2022/0029673 A1    Jan. 27, 2022

(30) Foreign Application Priority Data

Sep. 27, 2018 (WO) ................ PCT/CN2018/108027

(51) Int. Cl.
*H04B 7/04* (2017.01)
*H04B 7/0456* (2017.01)
*H04B 7/0408* (2017.01)

(52) U.S. Cl.
CPC ......... *H04B 7/0478* (2013.01); *H04B 7/0408* (2013.01)

(58) Field of Classification Search
CPC ....... H04B 7/0478; H04B 7/0408; H04B 7/10
See application file for complete search history.

(56) References Cited

U.S. PATENT DOCUMENTS

2016/0142117 A1    5/2016  Rahman et al.
2017/0048037 A1*   2/2017  Yen ....................... H04L 5/0048
(Continued)

FOREIGN PATENT DOCUMENTS

CN    107094041 A    8/2017
CN    107302389 A    10/2017
(Continued)

OTHER PUBLICATIONS

International Search Report and Written Opinion—PCT/CN2019/108051—ISA/EPO—dated Dec. 31, 2019.
(Continued)

*Primary Examiner* — Hashim S Bhatti
(74) *Attorney, Agent, or Firm* — QUALCOMM Incorporated

(57) ABSTRACT

Various aspects of the present disclosure generally relate to wireless communication. In some aspects, a user equipment may determine channel state information for a communication link, wherein the channel state information is based at least in part on a linear combination associated with a plurality of beams of the communication link, wherein a first set of beams used for a first subband, of a plurality of subbands of the communication link, is different than a second set of beams used for a second subband of the plurality of subbands, and wherein the plurality of beams includes the first set of beams and the second set of beams; and transmit the channel state information. Numerous other aspects are provided.

60 Claims, 5 Drawing Sheets

(56) References Cited

U.S. PATENT DOCUMENTS

| | | | |
|---|---|---|---|
| 2018/0034523 A1* | 2/2018 | Kim | H04B 7/0626 |
| 2018/0145737 A1 | 5/2018 | Rahman et al. | |
| 2018/0234148 A1* | 8/2018 | Li | H04B 7/065 |
| 2021/0067981 A1* | 3/2021 | Nilsson | H04B 7/0634 |
| 2021/0328646 A1* | 10/2021 | Wu | H04B 7/0617 |
| 2021/0353251 A1* | 11/2021 | Hope Simpson | A61B 8/14 |

FOREIGN PATENT DOCUMENTS

| | | |
|---|---|---|
| CN | 108111199 A | 6/2018 |
| CN | 108111200 A | 6/2018 |
| CN | 108111211 A | 6/2018 |
| WO | 2018126988 A1 | 7/2018 |

OTHER PUBLICATIONS

International Search Report and Written Opinion—PCT/CN2018/108027—ISA/EPO—dated Apr. 28, 2019.
Ericsson: "Encoding and Mapping of CSI Parameters", R1-1714285, 3GPP TSG-RAN WG1 #90, Encoding and Mapping OF CSI Parameters, 3rd Generation Partnership Project, Mobile Competence Centre, 650, Route Des Lucioles, F-06921, Sophia-Antipolis Cedex, France, vol. RAN WG1, No. Prague, Czech Republic, Aug. 21, 2017-Aug. 25, 2017, Aug. 20, 2017, XP051317071, 7 Pages.
Supplementary European Search Report—EP19867570—Search Authority—The Hague—dated May 19, 2022.
Taiwan Search Report—TW108135077—TIPO—dated Jun. 17, 2023.

* cited by examiner

SUBBAND-GRANULARITY LINEAR COMBINATION FOR A CSI CODEBOOK

CROSS-REFERENCE TO RELATED APPLICATIONS

This application is a 371 national stage of PCT Application No. PCT/CN2019/108051 filed on Sep. 26, 2019, entitled "SUBBAND-GRANULARITY LINEAR COMBINATION FOR A CSI CODEBOOK," which claims priority to PCT Application No. PCT/CN2018/108027, filed on Sep. 27, 2018, entitled "SUBBAND-GRANULARITY LINEAR COMBINATION FOR A CSI CODEBOOK," which are hereby expressly incorporated by reference herein.

FIELD OF THE DISCLOSURE

Aspects of the present disclosure generally relate to wireless communication, and more particularly to techniques and apparatuses for subband-granularity linear combination for a channel state information (CSI) codebook.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining channel state information for a communication link, wherein the channel state information is based at least in part on a linear combination associated with a plurality of beams of the communication link, wherein a first set of beams used for a first subband, of a plurality of subbands of the communication link, is different than a second set of beams used for a second subband of the plurality of subbands, and wherein the plurality of beams includes the first set of beams and the second set of beams; and transmitting the channel state information.

In some aspects, a user equipment for wireless communication may include memory and one or more processors operatively coupled to the memory. The memory and the one or more processors may be configured to determine channel state information for a communication link, wherein the channel state information is based at least in part on a linear combination associated with a plurality of beams of the communication link, wherein a first set of beams used for a first subband, of a plurality of subbands of the communication link, is different than a second set of beams used for a second subband of the plurality of subbands, and wherein the plurality of beams includes the first set of beams and the second set of beams; and transmit the channel state information.

In some aspects, a non-transitory computer-readable medium may store one or more instructions for wireless communication. The one or more instructions, when executed by one or more processors of a user equipment, may cause the one or more processors to determine channel state information for a communication link, wherein the channel state information is based at least in part on a linear combination associated with a plurality of beams of the communication link, wherein a first set of beams used for a first subband, of a plurality of subbands of the communication link, is different than a second set of beams used for a second subband of the plurality of subbands, and wherein the plurality of beams includes the first set of beams and the second set of beams; and transmit the channel state information.

In some aspects, an apparatus for wireless communication may include means for determining channel state information for a communication link, wherein the channel state information is based at least in part on a linear combination associated with a plurality of beams of the communication link, wherein a first set of beams used for a first subband, of a plurality of subbands of the communication link, is different than a second set of beams used for a second subband of the plurality of subbands, and wherein the plurality of beams includes the first set of beams and the second set of beams; and means for transmitting the channel state information.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
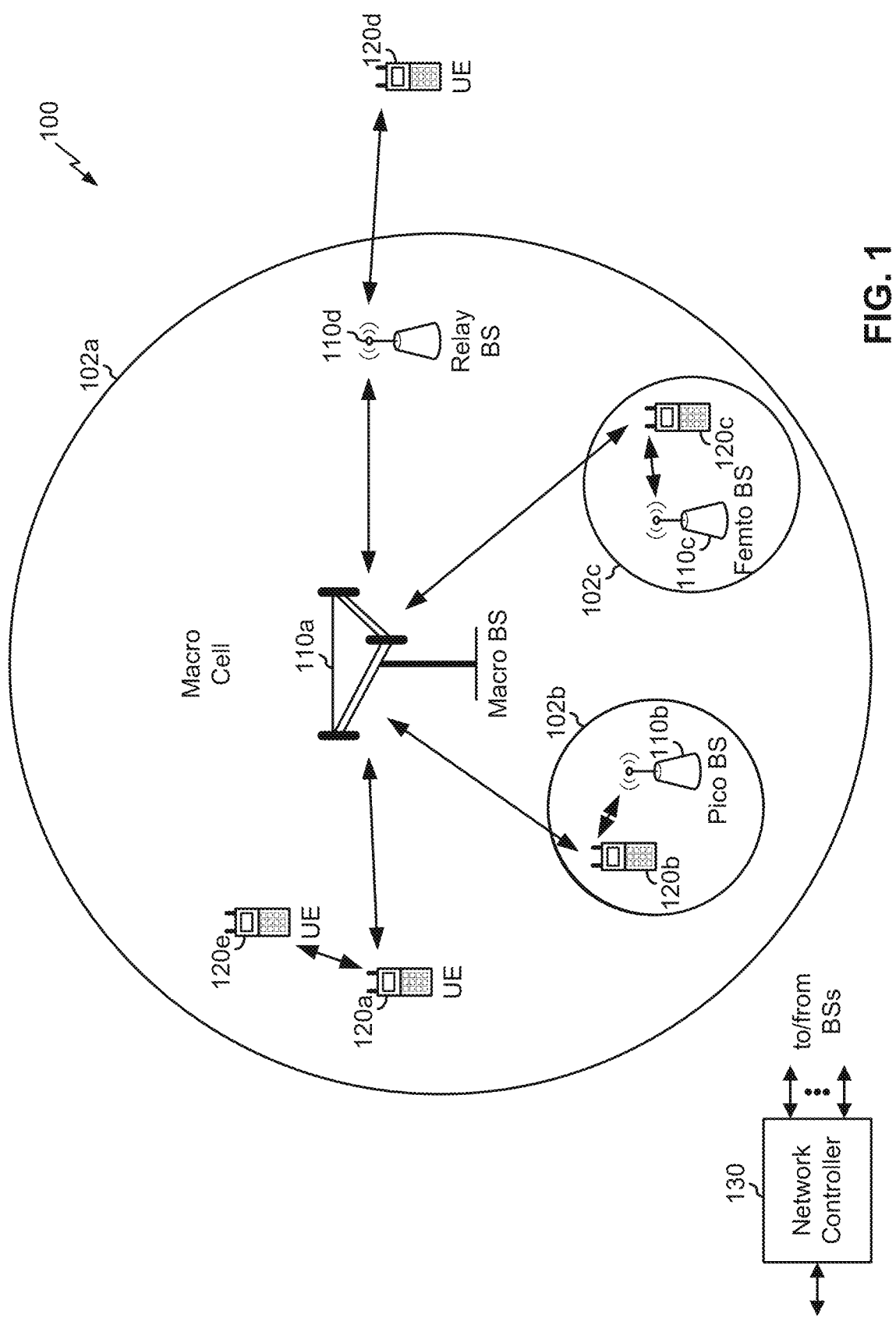
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
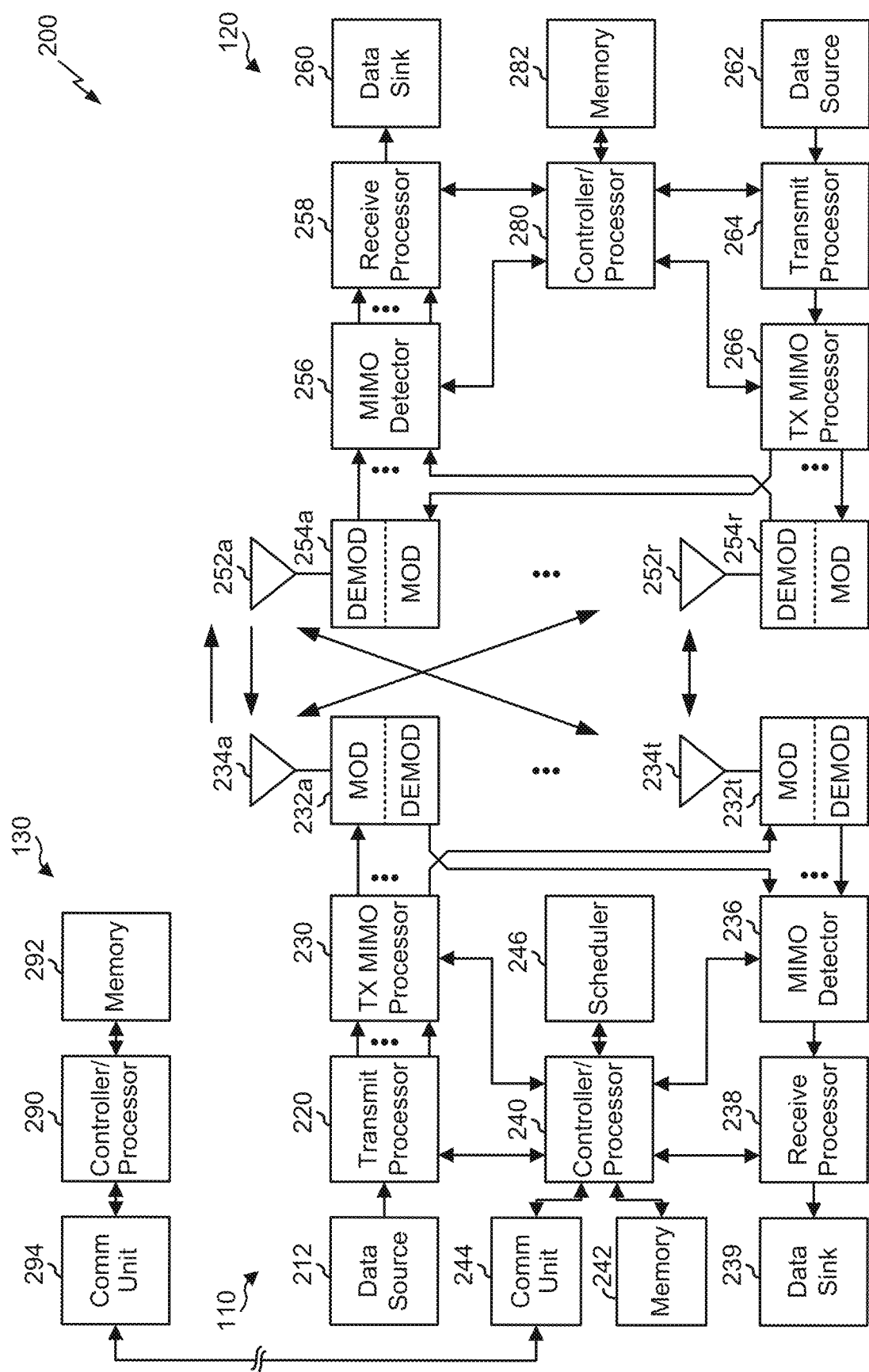
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with subband-granularity linear combination for a CSI codebook, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining channel state information for a communication link, wherein the channel state information is based at least in part on a linear combination associated with a plurality of beams of the communication link, wherein a first set of beams used for a first subband, of a plurality of subbands of the communication link, is different than a second set of beams used for a second subband of the plurality of subbands, and wherein the plurality of beams includes the first set of beams and the second set of beams; means for transmitting the channel state information; and/or the like. In some aspects, such means may include one or more components of UE 120 described in connection with FIG. 2.

As indicated above, FIG. 2 is provided merely as an example. Other examples may differ from what is described with regard to FIG. 2.

A BS (e.g., BS 110) may transmit beams to a UE (e.g., UE 120). For example, the BS may use an antenna panel that can generate beams at a geometric displacement from each other. The BS and the UE may select a set of beams that are to be used for communication between the BS and the UE. For example, the set of beams transmitted from the BS to the UE may be referred to herein as a communication link, a downlink, and/or the like.

In some aspects, the UE may select a set of beams, of a plurality of beams, transmitted by the BS as part of a beam selection procedure or a beam refinement procedure. For example, the UE may select the set of beams based at least in part on the set of beams being associated with favorable characteristics (e.g., a satisfactory receive power, signal to interference plus noise (SINR) value, and/or the like). The set of beams may be orthogonal to each other (e.g., may be associated with an orthogonal basis). The UE may generate a codeword that indicates the set of beams and parameters to be used for using a codebook. One such codebook is the Type II codebook, prescribed in 5G/NR. The Type II codebook may use a two-stage procedure to generate the codeword: a first stage wherein the set of beams is selected for a wideband of the communication link (e.g., sometimes referred to herein as W1), and a second stage wherein linear combination is performed, for a set of subbands, using the set of beams for each set of subbands. The codeword may be based at least in part on the linear combination, and may indicate the set of beams and/or respective amplitudes, phase coefficients, and/or the like. Thus, the UE may provide an indication of channel state at the UE and may request the set of beams to be used for the UE.

In some cases, the practice of selecting the set of beams at the wideband granularity may impact performance of the communication link. For example, in frequency-selected channels, and particularly at the cell edge, the orthogonality of the set of beams may not be ideal for different subbands, and interference profiles of the different subbands may be different. In such a case, beam performance may be negatively impacted when the same set of beams is used for all subbands. Furthermore, attempting to determine a codeword using different sets of beams at the beam selection stage (e.g., the W1 stage) may lead to prohibitive overhead for the CSI feedback.

Some techniques and apparatuses described herein select a set of beams (e.g., orthogonal beams) at the W1 stage for a wideband, and determine a linear combination for multiple subbands using different subsets of the set of beams. For example, a first subband may be associated with a first subset of beams, of the set of beams, and a second subband may be associated with a second subset of beams of the set of beams. The different subsets of beams may be selected to improve performance of the communication link between the BS and the UE, as described in more detail below. By selecting the subsets of beams at the linear combination stage, overhead of the CSI feedback is reduced and network performance is improved.

Figure 3:
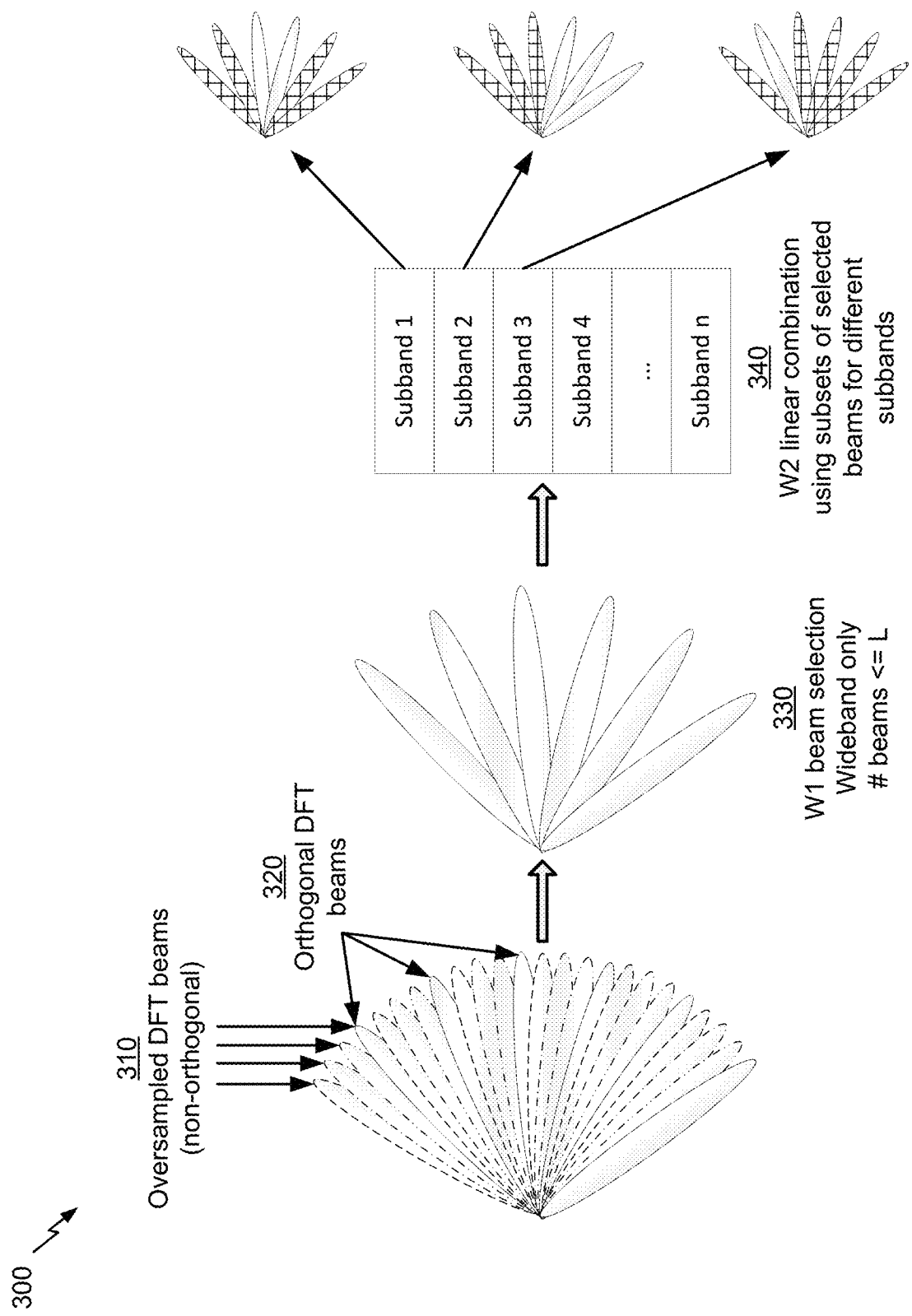
FIG. 3 is a diagram illustrating an example of subband-granularity linear combination for a CSI codebook, in accordance with various aspects of the present disclosure.

FIG. 3 is a diagram illustrating an example 300 of subband-granularity linear combination for a CSI codebook, in accordance with various aspects of the present disclosure. As shown, example 300 includes a set of beams that may be transmitted, for example, by a BS (e.g., BS 110, not shown). As shown by reference number 310, some of the beams may be non-orthogonal to each other, and, as shown by reference number 310, some of the beams may be orthogonal to each other. For example, the beams shown by reference number 310 may be generated using oversampling, and may not be orthogonal to each other. The beams shown by reference number 320 may be orthogonal to each other. Note that the beams shown by reference number 320 have the same border pattern. Beams of example 300 that have the same border pattern are orthogonal to each other.

A UE (e.g., UE 120, not shown) may determine CSI and/or may provide CSI feedback for the beams using a codebook. The codebook described herein is the Type II codebook of 5G/NR, which provides precoder feedback at a higher spatial resolution than a Type I codebook by using a linear combination codebook. The beams may carry a reference signal (RS), such as a CSI-RS. The UE may determine the CSI feedback based at least in part on the reference signal. In some aspects, when the reference signal is beamformed or precoded, the UE may use a beamformed (BF) codebook, such as a Type II BF codebook. In some aspects, when the reference signal is not beamformed or precoded, the UE may use a Type II codebook such as a single-panel (SP) Type II codebook, although the techniques and apparatuses described herein are not limited to those involving single-panel beamforming or the SP Type II codebook. As used herein, "Type II codebook" may refer to the codebook for non-precoded reference signals, and "Type II BF codebook" may refer to the codebook for precoded or beamformed reference signals.

As shown by reference number 330, the UE may select a set of beams for the wideband of the communication link. As used herein, a wideband refers to a system bandwidth of the communication link or the UE. A subband refers to a subset of the system bandwidth. For example, a subband may have one or more contiguous resource blocks of the wideband, and the wideband may include all resource blocks of the system bandwidth.

As shown, the UE may select up to L beams. L may be a configurable value. For example, L may be configured to be 2, 3, 4, 5, 6, 7, 8, or a different value. The selection of the up to L beams is described in more detail below. The L beams may be orthogonal to each other. Here, the UE selects a set of 6 beams, shown as having solid borders, indicating that the 6 beams are orthogonal to each other.

As shown by reference number 340, the UE may perform linear combination using subsets of the up to L beams for different subbands. For example, for subband 1, the UE uses a first, second, fifth, and sixth beam, indicated by the grid hatching of the corresponding subset of beams. For subband 2, the UE uses a first, second, and third beam of the up to L beams. It can be seen that different numbers of beams can be used for different subbands and different beams can be used for the different subbands. In some cases, and as shown, the first subset of beams (e.g., associated with subband 1) and the second subset of beams (e.g., associated with subband 2) may share at least one beam in common. In some aspects, the same number of beams can be used for two or more subbands. The selection of the different subsets of the up to L beams, and the linear combination of the subbands, is described in more detail below.

In some aspects, the UE may implicitly report the subband beam selections at the W2 stage. For example, the UE may determine the linear combination using amplitude values for beams and subbands so that the subband beam selections are implicitly indicated by the result of the linear combination. This is described in more detail below. In some aspects, the UE may explicitly report the subband beam selections. For example, the UE may determine a set of vectors (e.g., bitmaps and/or the like) that explicitly indicate which beams are to be used for each subband of the wideband. This is also described in more detail below.

In some aspects, the UE may determine the CSI using the Type II codebook. The CSI may be expressed by a value W. For a Rank 1 communication link, $$W = \begin{bmatrix} \tilde{w}_{0,0} \\ \tilde{w}_{1,0} \end{bmatrix},$$

and W may be normalized to 1. For a Rank 2 communication link $$W = \begin{bmatrix} \tilde{w}_{0,0} & \tilde{w}_{0,1} \\ \tilde{w}_{1,0} & \tilde{w}_{1,1} \end{bmatrix},$$

and columns of W may be normalized to $$\frac{1}{\sqrt{2}}.$$

The weighted combination of M beams (M less than or equal to L) for a subband is represented by $$\tilde{w}_{r,l} = \sum_{i=0}^{L-1} b^{(SB)}_{k_1^{(i)} k_2^{(i)}} \cdot p^{(SB)}_{r,l,i} \cdot c_{r,l,i} \cdot b_{k_1,k_2}$$

represents an oversampled 2D DFT beam, so $$b^{(SB)}_{k_1^{(i)} k_2^{(i)}}$$

may represent the subband's selected beams, which are orthogonal for each i=0~M−1 (since the beams from which the subband's selected beams are selected are also orthogonal). r can be 0 or 1 and represents a polarization state. l can be between 0 and 1 and represents the layer of the beam. i can be between 0 and M−1 and identifies the corresponding beam. $p_{r,l,i}^{(SB)}$ is a subband (SB) beam amplitude scaling factor. $c_{r,l,i}$ is a beam combining coefficient based at least in part on phase.

The amplitude scaling for the beams may be independently selected for each beam, polarization, and/or layer. Furthermore, the amplitude scaling may be selected at the subband granularity. In some aspects, the amplitude scaling may be selected only at the subband granularity. In some aspects, for a subband, amplitude scaling values may be different for different polarization states and layers. In other words, for a particular $p_{r,l,i}^{(SB)}$: ($p_{0,0,i}^{(SB)} \neq p_{0,1,i}^{(SB)} \neq p_{1,0,i}^{(SB)} \neq p_{1,1,i}^{(SB)}$) are possible. In this case, the set of possible values for a subband amplitude value set may include the following: $\{1, \sqrt{0.5}, \sqrt{0.25}, \sqrt{0.125}, \sqrt{0.0625}, \sqrt{0.0313}, \sqrt{0.0156}, 0\}$.

For the implicit reporting of the subband beam selections, the amplitude scaling factor may be used to indicate which beams are to be used for each subband. For example, for a particular subband, an amplitude scaling factor of 0 may be used for beams that are not to be used for the particular subband. Thus, the UE may determine a linear combination, based at least in part on the amplitude scaling factors for the subbands, that takes into account different beam combinations for different subbands. Thus, implicit reporting of the different beam combinations is enabled, thereby improving network performance and reducing overhead in comparison to a configuration where the different beam combinations were reported at the wideband granularity.

The beam combining coefficient may be selected independently for each beam, polarization, and layer. For example, the beam combining coefficient may be per subband, and may be selected from the set of values $$\{e^{j\frac{\pi n}{2}}, n = 0, 1, 2, 3\}$$

(for 2 bits) or $$\{e^{j\frac{\pi n}{4}}, n = 0, 1, \ldots, 7\}$$

(for 3 bits).

In some aspects, the UE may determine the CSI using a Type II BF codebook. When using the Type II BF codebook, at the W1 stage, the UE may determine a vector based at least in part on a set of selected ports. For example, a reference signal (e.g., a CSI-RS and/or the like) may be beamformed using a plurality of ports. The UE may select a plurality of ports for the CSI based at least in part on the reference signal. For example, the UE may determine $$W_1 = \begin{bmatrix} E_{\frac{X}{2} \times L} & 0 \\ 0 & E_{\frac{X}{2} \times L} \end{bmatrix}$$

where X is the number of ports. L may include any integer (e.g., any integer greater than 1, any integer between and including 2 and 8, and/or the like). In some aspects, X may have greater than 32 possible values, may have up to 64 possible values, or may have a different configuration of possible values.

$$E_{\frac{X}{2} \times L} = \left[ e_{\mathrm{mod}(md,\frac{X}{2})}^{(\frac{X}{2})} \ e_{\mathrm{mod}(md+1,\frac{X}{2})}^{(\frac{X}{2})} \ \cdots \ e_{\mathrm{mod}(md+L-1,\frac{X}{2})}^{(\frac{X}{2})} \right],$$

wherein $$e_i^{(\frac{X}{2})}$$

is a length $-\frac{X}{2}$ vector with i-th element equal to 1 for a selected beam and 0 elsewhere. The port selection may be as follows:

$$m \in \left\{0, 1, \ldots, \left\lceil \frac{X}{2d} \right\rceil - 1 \right\},$$

wherein the calculation and reporting of m is wideband (e.g., using $$\left\lceil \log_2\left(\frac{X}{2d}\right) \right\rceil$$

bits or a different number of bits). d may identify a sampling size for port selection. The value of d may be configurable: $d \in \{1,2,3,4,5,6,7,8\}$ under the condition that $$d \leq \frac{X}{2}$$

and $d \leq L$.

The amplitude scaling values and phase combining coefficients may be determined in accordance with the procedures described in connection with the Type II codebook in connection with FIG. 3, above. Thus, the UE may determine CSI using the Type II BF codebook, which may implicitly indicate the selected beams for each subband of the communication link. Thus, network performance may be improved without unmanageable CSI overhead.

In some aspects, the UE may explicitly indicate the subband beam selection at the W2 stage. For example, the UE may determine: $W_2 = W_{21} * W_{22}$, wherein $$W_{21} = \begin{bmatrix} \hat{E}_{L \times M} & 0 \\ 0 & \hat{E}_{L \times M} \end{bmatrix}. \ \hat{E}_{L \times M} = \begin{bmatrix} e_0^{(L)} \ e_1^{(L)} \ \cdots \ e_{M-1}^{(L)} \end{bmatrix}.$$

The UE may determine a bitmap of L bits to indicate the subband beam selection. The bitmaps may also indicate the concrete format of $\hat{E}_{L \times M}$. For example, a bitmap may have $b_0 b_1 \ldots b_{L-1}$, $b_i \in \{0, 1\}$ with M elements equal to 1. For each $b_i = 1$, $e^{(L)}_m$ is a length L vector with i-th element equal to 1 at the beams to be used for the subband and 0 elsewhere. The UE may report the L-bit bitmaps for each subband of the communication link. In some aspects, the UE may be configured to disable the L-bit bitmap report. In such a case, the UE may use a legacy codebook, or may use the implicit indication technique described above. $W_{22}$ may indicate amplitude scaling values and phase combining coefficients, along with their configurations, similarly to a legacy Type II codebook. For example, amplitude scaling values may be indicated at the wideband granularity and/or the subband granularity, and phase combining coefficients may be indicated at the subband granularity.

An example of the explicit indication of the subband beam selection for a case wherein L=8 and M=4 is provided below. For the purpose of this example, assume X=64 and d=8. In that case, $$E_{\frac{X}{2} \times L} = \left[ e_{\mathrm{mod}(md,\frac{X}{2})}^{(\frac{X}{2})} \ e_{\mathrm{mod}(md+1,\frac{X}{2})}^{(\frac{X}{2})} \ \cdots \ e_{\mathrm{mod}(md+L-1,\frac{X}{2})}^{(\frac{X}{2})} \right] \text{ and}$$

$$m \in \left\{0, 1, \ldots, \left\lceil \frac{X}{2d} \right\rceil - 1 \right\} = \{0, 1, 2, 3\}.$$

Assume that a first subset of beams, represented by the bitmap 01010101, is selected for a first subband (e.g., subband 1) and a second subset of beams, represented by the bitmap 11100000, is selected for a second subband. In that case, m=1, the $E_{\frac{X}{2} \times L}$ vector, the $W_1$ vector, and the $W_{21}$ vector, respectively, may be:

$$m = 1 : E_{\frac{X}{2} \times L} = \begin{bmatrix} 0 & 0 & 0 & 0 & 0 & 0 & 0 & 0 \\ \cdot & \cdot & \cdot & \cdot & \cdot & \cdot & \cdot & \cdot \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ \cdot & \cdot & \cdot & \cdot & \cdot & \cdot & \cdot & \cdot \\ 0 & 0 & 0 & 0 & 0 & 0 & 0 & 0 \end{bmatrix}_{32 \times 8}$$

$$W_1 = \begin{bmatrix} E_{\frac{X}{2} \times L} & \\ & E_{\frac{X}{2} \times L} \end{bmatrix}_{64 \times 16}, W_{21} = \begin{bmatrix} \hat{E}_{L \times M} & \\ & \hat{E}_{L \times M} \end{bmatrix}_{16 \times 8}.$$

For subband 1, $$\hat{E}_{L \times M} = \begin{bmatrix} 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \end{bmatrix}_{8 \times 4}.$$

For subband 2, $$\hat{E}_{L \times M} = \begin{bmatrix} 1 & 0 & 0 & 0 \\ 0 & 1 & 0 & 0 \\ 0 & 0 & 1 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}_{8 \times 4}.$$

Combining the above, $$W_1 * W_{21} * W_{22} = \begin{bmatrix} E_{\frac{X}{2} \times L} * \hat{E}_{L \times M} & 0 \\ 0 & E_{\frac{X}{2} \times L} \cdot \hat{E}_{L \times M} \end{bmatrix}_{64 \times 8} * W_{22}.$$

For subband 1, $E_{\frac{X}{2} \times L} \cdot \hat{E}_{L \times M} =$ $$\begin{bmatrix} 0 & 0 & 0 & 0 & 0 & 0 & 0 & 0 \\ \cdot & \cdot & \cdot & \cdot & \cdot & \cdot & \cdot & \cdot \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ \cdot & \cdot & \cdot & \cdot & \cdot & \cdot & \cdot & \cdot \\ 0 & 0 & 0 & 0 & 0 & 0 & 0 & 0 \end{bmatrix}_{32 \times 8} * \begin{bmatrix} 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \end{bmatrix}_{8 \times 4} == \begin{bmatrix} 0 & 0 & 0 & 0 \\ \cdot & \cdot & \cdot & \cdot \\ 0 & 0 & 0 & 0 \\ 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \\ \cdot & \cdot & \cdot & \cdot \\ 0 & 0 & 0 & 0 \end{bmatrix}_{32 \times 4}$$

For subband 2, $E_{\frac{X}{2} \times L} \cdot \hat{E}_{L \times M} =$ $$\begin{bmatrix} 0 & 0 & 0 & 0 & 0 & 0 & 0 & 0 \\ \cdot & \cdot & \cdot & \cdot & \cdot & \cdot & \cdot & \cdot \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ \cdot & \cdot & \cdot & \cdot & \cdot & \cdot & \cdot & \cdot \\ 0 & 0 & 0 & 0 & 0 & 0 & 0 & 0 \end{bmatrix}_{32 \times 8} * \begin{bmatrix} 1 & 0 & 0 & 0 \\ 0 & 1 & 0 & 0 \\ 0 & 0 & 1 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix}_{8 \times 4} == \begin{bmatrix} 0 & 0 & 0 & 0 \\ \cdot & \cdot & \cdot & \cdot \\ 0 & 0 & 0 & 0 \\ 1 & 0 & 0 & 0 \\ 0 & 1 & 0 & 0 \\ 0 & 0 & 1 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 0 & 0 \\ \cdot & \cdot & \cdot & \cdot \\ 0 & 0 & 0 & 0 \end{bmatrix}_{32 \times 4}$$

$W_{22}$ may be implemented in accordance with the subband-granularity amplitude scaling values and phase combining coefficients, as described in more detail elsewhere herein. In this way, the UE may use bitmaps of respective subband beam selections to explicitly signal the subband beam selections and to determine the format of $\hat{E}_{L \times M}$.

As indicated above, FIG. 3 is provided as an example. Other examples may differ from what is described with respect to FIG. 3.

Figure 4:
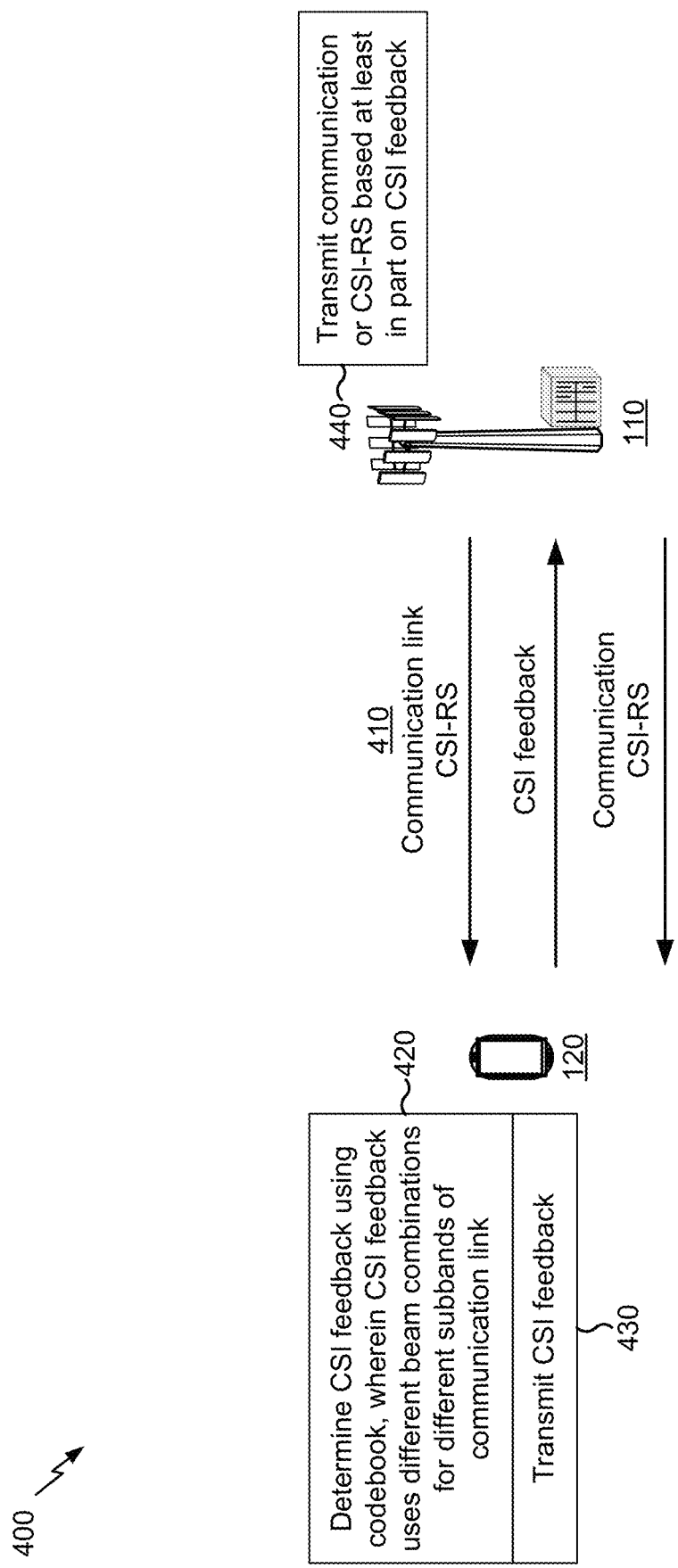
FIG. 4 is a diagram illustrating an example of communication using a subband-granularity linear combination for a CSI codebook, in accordance with various aspects of the present disclosure.

FIG. 4 is a diagram illustrating an example 400 of communication using CSI based at least in part on a subband-granularity linear combination for a CSI codebook, in accordance with various aspects of the present disclosure. As shown in FIG. 4, and by reference number 410, a B S 110 may transmit beams of a communication link to a UE 120. The communication link may use oversampled non-orthogonal DFT beams (as shown by reference number 310 of FIG. 3) and sets of orthogonal DFT beams (as shown by reference number 320 of FIG. 3). Furthermore, the beams of the communication link may carry a reference signal, such as the CSI-RS shown here. For example, the beams may carry a non-precoded CSI-RS or a beamformed CSI-RS.

As shown by reference number 420, the UE 120 may determine CSI feedback using a codebook. For example, the UE may use a Type II codebook when the reference signals of the communication link are not precoded or beamformed, or may use a Type II BF codebook when the reference signals of the communication link are precoded or beamformed. As further shown, the CSI feedback may use different beam combinations for different subbands of the communication link. In some aspects, the different beam combinations may be implicitly signaled (e.g., based at least in part on the linear combination). In some aspects, the different beam combinations may be explicitly signaled (e.g., using the $W_1$ and $W_{12}$ vectors described above) or may be implicitly signaled based at least in part on the linear combination using the different beam combinations.

As shown by reference number 430, the UE may transmit the CSI feedback. For example, the UE may transmit the information explicitly or implicitly identifying the different beam combinations. As shown by reference number 440, the BS 110 may transmit a communication or a CSI-RS based at least in part on the CSI feedback. For example, the BS 110 may transmit the communication or the CSI-RS based at least in part on the different beam combinations for the respective subbands. In this way, the UE may signal CSI feedback using different beam combinations for different subbands, which may improve network performance when the different subbands are subject to different interference profiles, and which may reduce overhead of signaling the different beam combinations.

As indicated above, FIG. 4 is provided as an example. Other examples may differ from what is described with respect to FIG. 4.

Figure 5:
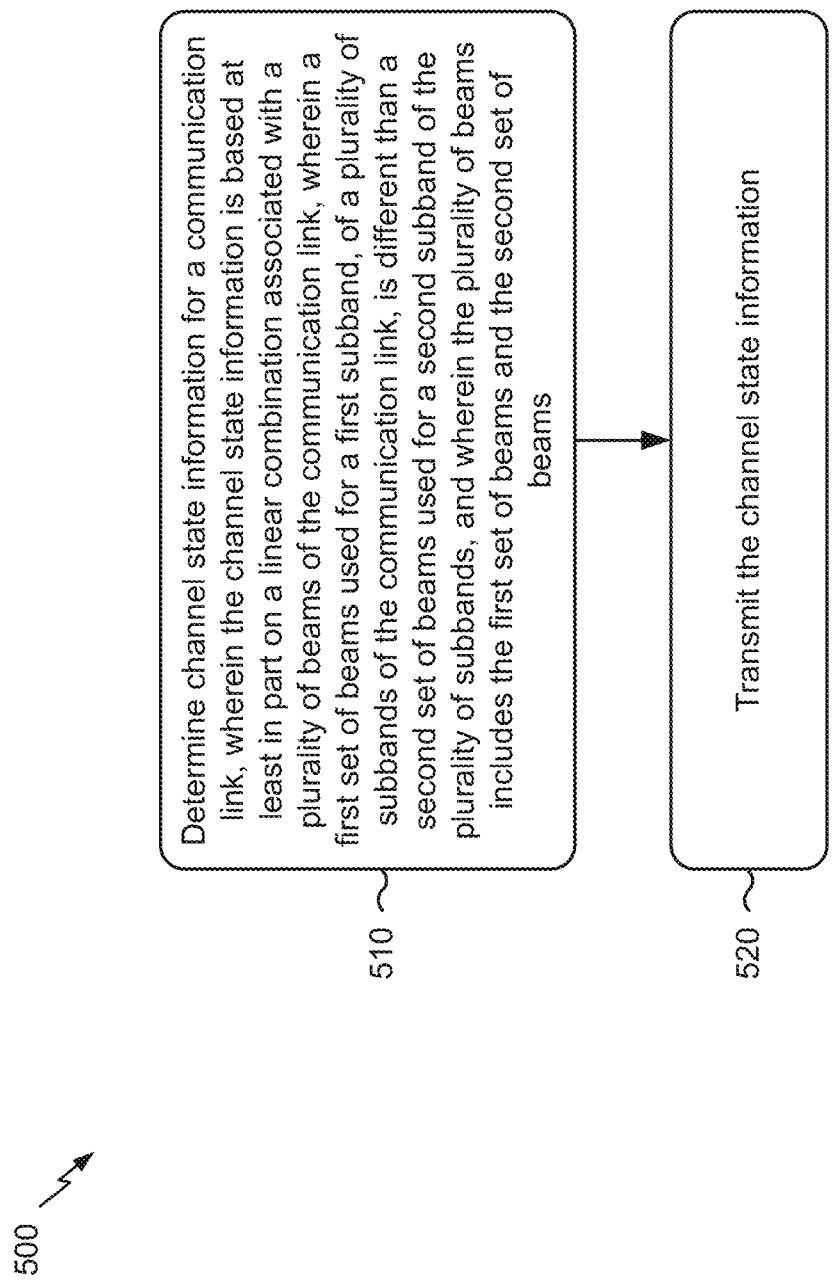
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs subband-granularity linear combination for a CSI codebook.

As shown in FIG. 5, in some aspects, process 500 may include determining channel state information for a communication link, wherein the channel state information is based at least in part on a linear combination associated with a plurality of beams of the communication link, wherein a first set of beams used for a first subband, of a plurality of subbands of the communication link, is different than a second set of beams used for a second subband of the plurality of subbands, and wherein the plurality of beams includes the first set of beams and the second set of beams (block 510). For example, the UE (e.g., using controller/processor 280 and/or the like) may determine channel state information for a communication link. The communication link may be between the UE and a base station. The communication link may be provided using beams transmitted by the base station. The UE may select a plurality of beams of the communication link (e.g., beams with an orthogonal basis) in the case of a non-precoded or non-beamformed reference signal. The UE may select a plurality of ports associated with the communication link (e.g., ports with which the reference signal is transmitted or received) in the case of a precoded or beamformed reference signal. The UE may perform a linear combination based at least in part on the plurality of beams. For example, a first set of beams (e.g., or ports) used for a first subband of the communication link may be different than a second set of beams (e.g., or ports) used for a second subband of the communication link.

As shown in FIG. 5, in some aspects, process 500 may include transmitting the channel state information (block 520). For example, the UE (e.g., using controller/processor 280, transmit processor 264, TX MIMO processor 266, MOD 254, antenna 252, and/or the like) may transmit the channel state information. In some aspects, the UE may transmit channel state information feedback. In some aspects, the base station may perform an action based at least in part on the channel state information. For example, the base station may transmit another reference signal or a communication based at least in part on the beams, amplitude scaling factors, combination coefficients, and/or the like of the channel state information. By providing the channel state information using linear combination at the subband granularity, performance of the communication link and efficiency of the channel state information may be improved.

Process 500 may include additional aspects, such as any single aspect or any combination of aspects described below and/or in connection with one or more other processes described elsewhere herein.

In a first aspect, the plurality of beams includes greater than 4 beams. In a second aspect, alone or in combination with the first aspect, the first set of beams and the second set of beams include at least one beam in common. In a third aspect, alone or in combination with the first aspect and/or the second aspect, a quantity of beams in the first set of beams is equal to a quantity of beams in the second set of beams. In a fourth aspect, alone or in combination with any one or more of the first through second aspects, a quantity of beams in the first set of beams is a different quantity than a quantity of beams in the second set of beams.

In a fifth aspect, alone or in combination with any one or more of the first through fourth aspects, the channel state information is based at least in part on a plurality of amplitude scaling values that are subband-specific and specific to beams, polarizations, and layers. In a sixth aspect, alone or in combination with any one or more of the first through fifth aspects, a particular amplitude scaling value indicates that a corresponding beam, of the plurality of beams, is not used with regard to a corresponding subband of the plurality of subbands. In a seventh aspect, alone or in combination with any one or more of the first through sixth aspects, the particular amplitude scaling value is zero.

In an eighth aspect, alone or in combination with any one or more of the first, second, or fourth through seventh aspects, the first set of beams is associated with a different number of beams than the second set of beams. In a ninth aspect, alone or in combination with any one or more of the first through eighth aspects, the plurality of beams is selected from a set of ports that includes more than 32 possible ports. In a tenth aspect, alone or in combination with any one or more of the first through ninth aspects, the channel state information explicitly identifies the first set of beams for the first subband and the second set of beams for the second subband. In an eleventh aspect, alone or in combination with any one or more of the first through ninth aspects, the channel state information explicitly identifies respective sets of beams for all subbands of the plurality of subbands. In a twelfth aspect, alone or in combination with any one or more of the first through eleventh aspects, when explicit identification of the first set of beams and the second set of beams is disabled, the channel state information is determined based at least in part on a linear combination configuration that uses a same set of beams, of the plurality of beams, for all subbands of the plurality of subbands. In a thirteenth aspect, alone or in combination with any one or more of the first through twelfth aspects, the channel state information is based at least in part on a plurality of amplitude scaling values that are wideband-specific and specific to beams, polarizations, and layers.

In a fourteenth aspect, alone or in combination with any one or more the first through thirteenth aspects, a particular amplitude scaling value indicates that a corresponding beam, of the plurality of beams, is not used with regard to a corresponding subband of the plurality of subbands.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 5 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting a plurality of beams for a wideband of a communication link,
    wherein respective linear combinations for multiple subbands are determined using different subsets of the plurality of beams,
    wherein channel state information for the communication link is determined based at least in part on the respective linear combinations determined for the multiple subbands,
    wherein a first set of beams used for a first subband, of the multiple subbands, is different than a second set of beams used for a second subband of the multiple subbands, and
    wherein the plurality of beams includes the first set of beams and the second set of beams; and
    transmitting the channel state information,
    wherein the channel state information includes a particular amplitude scaling value for a first beam, of the plurality of beams, to indicate that the first beam is not included in the first subband.

2. The method of claim 1, wherein the plurality of beams includes greater than 4 beams.

3. The method of claim 1, wherein the first set of beams and the second set of beams include at least one beam in common.

4. The method of claim 1, wherein a quantity of beams in the first set of beams is equal to a quantity of beams in the second set of beams.

5. The method of claim 1, wherein a quantity of beams in the first set of beams is a different quantity than a quantity of beams in the second set of beams.

6. The method of claim 1, wherein the channel state information is based at least in part on a plurality of amplitude scaling values that are subband-specific and specific to beams, polarizations, and layers.

7. The method of claim 1, wherein the particular amplitude scaling value is zero.

8. The method of claim 1, wherein the plurality of beams is selected from a set of ports that includes more than 32 possible ports.

9. The method of claim 1, wherein the channel state information identifies the first set of beams for the first subband and the second set of beams for the second subband.

10. The method of claim 9, wherein the channel state information identifies respective sets of beams for all subbands of the multiple subbands.

11. The method of claim 9, wherein, when explicit identification of the first set of beams and the second set of beams is disabled, the channel state information is determined based at least in part on a linear combination configuration that uses a same set of beams, of the plurality of beams, for all subbands of the multiple subbands.

12. The method of claim 1, wherein the channel state information is based at least in part on a plurality of amplitude scaling values that are wideband-specific and specific to beams, polarizations, and layers.

13. The method of claim 12, wherein the particular amplitude scaling value indicates that a second beam, of the plurality of beams, is not used with regard to the second subband.

14. The method of claim 1, wherein the respective linear combinations are determined using amplitude values for beams and subbands.

15. The method of claim 14, wherein determining the respective linear combinations using the amplitude values for the beams and the subbands enables a determination that the first subband includes the first set of beams and that the second subband includes the second set of beams.

16. A user equipment (UE) for wireless communication, comprising:
a memory; and
one or more processors coupled to the memory, the one or more processors configured to:
select a plurality of beams for a wideband of a communication link,
wherein respective linear combinations for multiple subbands are determined using different subsets of the plurality of beams,
wherein channel state information for the communication link is determined based at least in part on the respective linear combinations determined for the multiple subbands,
wherein a first set of beams used for a first subband, of the multiple subbands, is different than a second set of beams used for a second subband of the multiple subbands, and
wherein the plurality of beams includes the first set of beams and the second set of beams; and
transmit the channel state information,
wherein the channel state information includes a particular amplitude scaling value for a first beam, of the plurality of beams, to indicate that the first beam is not included in the first subband.

17. The UE of claim 16, wherein the plurality of beams includes greater than 4 beams.

18. The UE of claim 16, wherein the first set of beams and the second set of beams include at least one beam in common.

19. The UE of claim 16, wherein a quantity of beams in the first set of beams is equal to a quantity of beams in the second set of beams.

20. The UE of claim 16, wherein a quantity of beams in the first set of beams is a different quantity than a quantity of beams in the second set of beams.

21. The UE of claim 16, wherein the channel state information is based at least in part on a plurality of amplitude scaling values that are subband-specific and specific to beams, polarizations, and layers.

22. The UE of claim 16, wherein the particular amplitude scaling value indicates that a second beam, of the plurality of beams, is not used with regard to the second subband.

23. The UE of claim 22, wherein the particular amplitude scaling value is zero.

24. The UE of claim 16, wherein the first set of beams is associated with a different number of beams than the second set of beams.

25. The UE of claim 16, wherein the plurality of beams is selected from a set of ports that includes more than 32 possible ports.

26. The UE of claim 16, wherein the channel state information identifies the first set of beams for the first subband and the second set of beams for the second subband.

27. The UE of claim 26, wherein the channel state information identifies respective sets of beams for all subbands of the multiple subbands.

28. The UE of claim 26, wherein, when explicit identification of the first set of beams and the second set of beams is disabled, the channel state information is determined based at least in part on a linear combination configuration that uses a same set of beams, of the plurality of beams, for all subbands of the multiple subbands.

29. The UE of claim 16, wherein the channel state information is based at least in part on a plurality of amplitude scaling values that are wideband-specific and specific to beams, polarizations, and layers.

30. The UE of claim 29, wherein the particular amplitude scaling value indicates that the first beam is not used with regard to the second subband.

31. A non-transitory computer-readable medium storing one or more instructions for wireless communication, the one or more instructions comprising:
one or more instructions that, when executed by one or more processors of a user equipment (UE), cause the one or more processors to:
select a plurality of beams for a wideband of a communication link,
wherein respective linear combinations for multiple subbands are determined using different subsets of the plurality of beams,
wherein channel state information for the communication link is determined based at least in part on the respective linear combinations determined for the multiple subbands,
wherein a first set of beams used for a first subband, of the multiple subbands, is different than a second set of beams used for a second subband of the multiple subbands, and
wherein the plurality of beams includes the first set of beams and the second set of beams; and
transmit the channel state information,
wherein the channel state information includes a particular amplitude scaling value for a first beam, of the plurality of beams, to indicate that the first beam is not included in the first subband.

32. The non-transitory computer-readable medium of claim 31, wherein the plurality of beams includes greater than 4 beams.

33. The non-transitory computer-readable medium of claim 31, wherein the first set of beams and the second set of beams include at least one beam in common.

34. The non-transitory computer-readable medium of claim 31, wherein a quantity of beams in the first set of beams is equal to a quantity of beams in the second set of beams.

35. The non-transitory computer-readable medium of claim 31, wherein a quantity of beams in the first set of beams is a different quantity than a quantity of beams in the second set of beams.

36. The non-transitory computer-readable medium of claim 31, wherein the channel state information is based at least in part on a plurality of amplitude scaling values that are subband-specific and specific to beams, polarizations, and layers.

37. The non-transitory computer-readable medium of claim 36, wherein the particular amplitude scaling value indicates that a second beam, of the plurality of beams, is not used with regard to the second subband.

38. The non-transitory computer-readable medium of claim 37, wherein the particular amplitude scaling value is zero.

39. The non-transitory computer-readable medium of claim 31, wherein the first set of beams is associated with a different number of beams than the second set of beams.

40. The non-transitory computer-readable medium of claim 31, wherein the plurality of beams is selected from a set of ports that includes more than 32 possible ports.

41. The non-transitory computer-readable medium of claim 31, wherein the channel state information identifies the first set of beams for the first subband and the second set of beams for the second subband.

42. The non-transitory computer-readable medium of claim 41, wherein the channel state information identifies respective sets of beams for all subbands of the multiple subbands.

43. The non-transitory computer-readable medium of claim 41, wherein, when explicit identification of the first set of beams and the second set of beams is disabled, the channel state information is determined based at least in part on a linear combination configuration that uses a same set of beams, of the plurality of beams, for all subbands of the multiple subbands.

44. The non-transitory computer-readable medium of claim 31, wherein the channel state information is based at least in part on a plurality of amplitude scaling values that are wideband-specific and specific to beams, polarizations, and layers.

45. The non-transitory computer-readable medium of claim 44, wherein the particular amplitude scaling value indicates that the first beam is not used with regard to the second subband.

46. An apparatus for wireless communication, comprising:
means for selecting a plurality of beams for a wideband of a communications link,
wherein respective linear combinations for multiple subbands are determined using different subsets of the plurality of beams,
wherein channel state information for the communication link is determined based at least in part on the respective linear combinations determined for the multiple subbands,
wherein a first set of beams used for a first subband, of the multiple subbands, is different than a second set of beams used for a second subband of the multiple subbands, and
wherein the plurality of beams includes the first set of beams and the second set of beams; and
means for transmitting the channel state information,
wherein the channel state information includes a particular amplitude scaling value for a first beam, of the plurality of beams, to indicate that the first beam is not included in the first subband.

47. The apparatus of claim 46, wherein the plurality of beams includes greater than 4 beams.

48. The apparatus of claim 46, wherein the first set of beams and the second set of beams include at least one beam in common.

49. The apparatus of claim 46, wherein a quantity of beams in the first set of beams is equal to a quantity of beams in the second set of beams.

50. The apparatus of claim 46, wherein a quantity of beams in the first set of beams is a different quantity than a quantity of beams in the second set of beams.

51. The apparatus of claim 46, wherein the channel state information is based at least in part on a plurality of amplitude scaling values that are subband-specific and specific to beams, polarizations, and layers.

52. The apparatus of claim 51, wherein particular amplitude scaling value indicates that a second beam, of the plurality of beams, is not used with regard to the second subband.

53. The apparatus of claim 52, wherein the particular amplitude scaling value is zero.

54. The apparatus of claim 46, wherein the first set of beams is associated with a different number of beams than the second set of beams.

55. The apparatus of claim 46, wherein the plurality of beams is selected from a set of ports that includes more than 32 possible ports.

56. The apparatus of claim 46, wherein the channel state information explicitly identifies the first set of beams for the first subband and the second set of beams for the second subband.

57. The apparatus of claim 56, wherein the channel state information identifies respective sets of beams for all subbands of the multiple subbands.

58. The apparatus of claim 56, wherein, when explicit identification of the first set of beams and the second set of beams is disabled, the channel state information is determined based at least in part on a linear combination configuration that uses a same set of beams, of the plurality of beams, for all subbands of the multiple subbands.

59. The apparatus of claim 46, wherein the channel state information is based at least in part on a plurality of amplitude scaling values that are wideband-specific and specific to beams, polarizations, and layers.

60. The apparatus of claim 59, wherein the particular amplitude scaling value indicates that the first beam is not used with regard to the second subband.

* * * * *